(12) United States Patent
Maron et al.

(10) Patent No.: US 7,962,677 B2
(45) Date of Patent: Jun. 14, 2011

(54) BUS ACCESS MODERATION SYSTEM

(75) Inventors: William A. Maron, Austin, TX (US); Diane Garza Flemming, Pflugerville, TX (US); Ghadir Robert Gholami, Austin, TX (US); Mysore Sathyanarayana Srinivas, Austin, TX (US); Octavian Florin Herescu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 12/173,211

(22) Filed: Jul. 15, 2008

(65) Prior Publication Data

US 2010/0017551 A1     Jan. 21, 2010

(51) Int. Cl.
    *G06F 13/00*     (2006.01)
(52) U.S. Cl. .......................................... 710/107; 710/60
(58) Field of Classification Search .................... 710/45, 710/60, 107, 112, 124, 240, 310
    See application file for complete search history.

(56) References Cited

U.S. PATENT DOCUMENTS

| | | | | |
|---|---|---|---|---|
| 5,555,420 A * | 9/1996 | Sarangdhar et al. | ......... | 710/266 |
| 5,740,380 A * | 4/1998 | LaBerge et al. | ............... | 710/107 |
| 6,058,450 A | 5/2000 | LaBerge | ....................... | 710/107 |
| 6,145,040 A | 11/2000 | LaBerge et al. | ............... | 710/107 |
| 6,658,510 B1 * | 12/2003 | Bartucca | ....................... | 710/107 |
| 6,735,653 B2 * | 5/2004 | Mathuna et al. | .............. | 710/105 |
| 6,910,088 B2 * | 6/2005 | LaBerge | ....................... | 710/117 |
| 7,003,606 B2 | 2/2006 | Fukushima et al. | .......... | 710/107 |
| 7,065,596 B2 * | 6/2006 | Kulick et al. | .................. | 710/240 |
| 7,096,289 B2 * | 8/2006 | Brown et al. | .................. | 710/107 |
| 7,231,477 B2 | 6/2007 | Toyokura | ...................... | 710/241 |

* cited by examiner

*Primary Examiner* — Khnah Dang
(74) *Attorney, Agent, or Firm* — David A. Mims, Jr.; Robert V. Wilder

(57) ABSTRACT

A method, programmed medium and system are provided in which system bus traffic is moderated with real-time data. The Operating System (OS) is enabled to get information from the firmware (FW) to determine if a resource threshold has been reached. This is accomplished by generating an interrupt to flag the OS when a bus request retry rate has reached a predetermined number. The system firmware plays an integral role in this mechanism, and should be interpreted as a general term which could also include a hypervisor technology. The system firmware will report the bus request retry rate to the operating system by way of, for example, a firmware-generated interrupt. The OS may have something similar to a kernel daemon/service running to intercept the interrupt notice. In the simplest case, the daemon/service will determine if the threshold has been met based on the feedback from the firmware. If so, it will generate a system call that will moderate traffic with an operating system tunable. In one example, the number of simultaneous multithreading (SMT) threads per core will be reduced using a system call. This effectively throttles back the amount of logical threads per core and effectively alleviates the bus request saturation.

15 Claims, 2 Drawing Sheets

BUS ACCESS MODERATION SYSTEM

FIELD OF THE INVENTION

The present invention relates generally to information processing systems and more particularly to a methodology and implementation for moderating saturated bus systems.

BACKGROUND OF THE INVENTION

The future of high performance computing is geared toward packing as much performance capability as possible into the smallest real estate as possible. More cores are being added to chips, more chips per computing module, more software execution threads per core, etc. All of this amounts to shifting performance barriers and more "congestion". As more cores per socket are added, each with 2 to 4 more logical threads, the challenge becomes keeping the system balanced. One side effect of an unbalanced system is that bus traffic will increase, and at peak usage, may saturate the system bus completely. The outcome will be a system bottlenecked on bus traffic, with underutilized CPU, memory, and I/O resources. The computing power of the machine will become limited by the size of the bus.

Some systems have attempted to moderate information traffic on a saturated system bus proactively based on weights supplied at some start-up point. Such systems however, may induce a lot more bus traffic because it must sample continually to maintain the weights and moderate the traffic, not to mention new bus requesters will mean re-evaluating everyone's weights. There is a lot of calculating and re-calculating and bus requesters must know what their bandwidth requirements are ahead of time. Such prior art applications have to rely on everyone else knowing their requirements to make the system work, and that is unlikely.

Thus, there is a need to provide a bus access moderation system which is passive and avoids the need to calculate and re-calculate bandwidth distribution among bandwidth requesting devices.

SUMMARY OF THE INVENTION

A method, programmed medium and system are provided in which system bus traffic is moderated with real-time data. The Operating System (OS) is enabled to get information from the firmware (FW) to determine if a resource threshold has been reached. This is accomplished by generating an interrupt to flag the OS when a bus request retry rate has reached a predetermined number. This methodology provides a system-generated reactive mechanism, which is inexpensive and provides instantaneous results. The system firmware plays an integral role in this mechanism, and should be interpreted as a general term which could also include a hypervisor technology. The system firmware will report the bus request retry rate to the operating system by way of, for example, a firmware-generated interrupt. The OS may have something similar to a kernel daemon/service running to intercept the interrupt notice. In the simplest case, the daemon/service will determine if the threshold has been met based on the feedback from the firmware. If so, it will generate a system call that will moderate traffic with an operating system tunable. In one example, the number of simultaneous multithreading (SMT) threads per core will be reduced using a system call. This effectively throttles back the amount of logical threads per core and effectively alleviates the bus request saturation.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
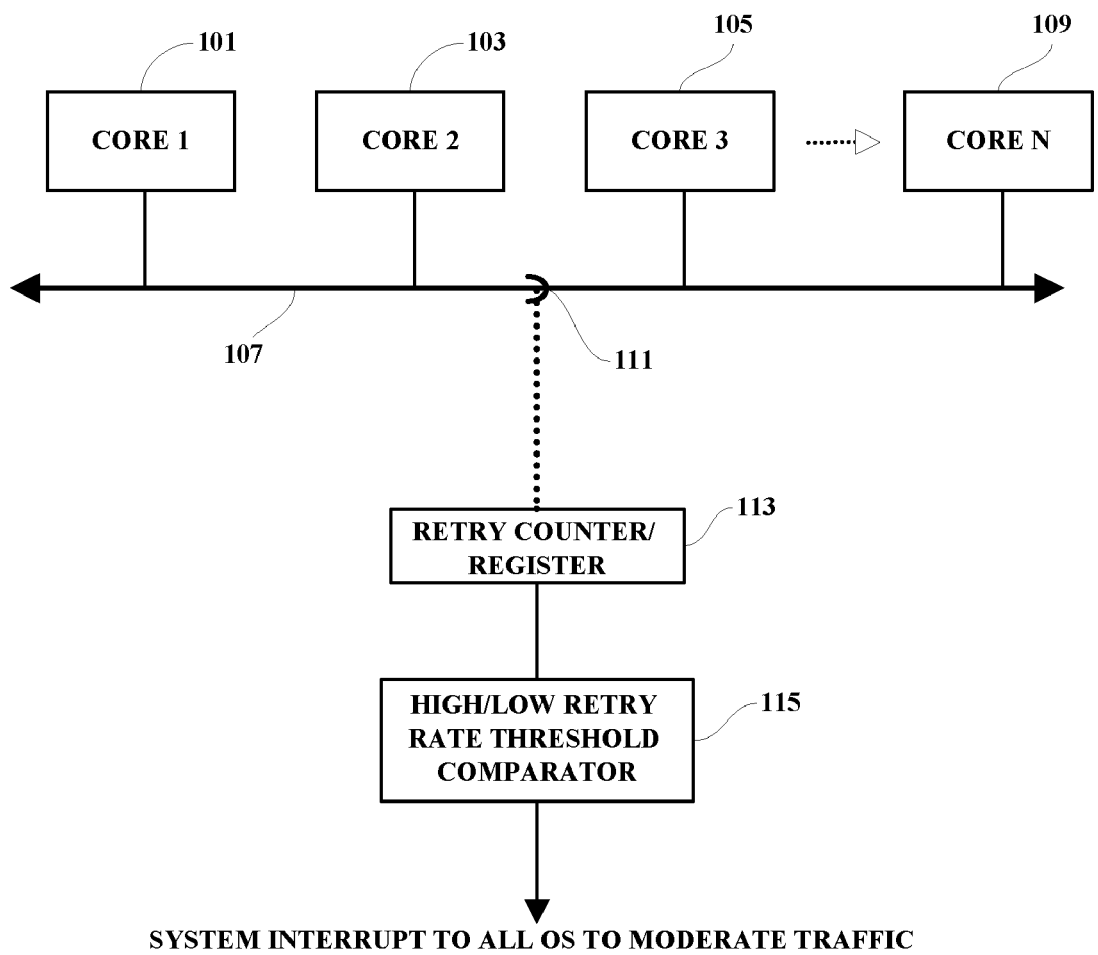
FIG. 1 is an illustration of one embodiment of an exemplary embodiment of the present invention.

The various methods discussed herein may be implemented within a computer system which includes processing means, memory, updateable storage, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Simultaneous multithreading or "SMT" is a processor design technology that allows multiple threads to issue instructions each cycle. Simultaneous multithreading enables multithreaded applications to execute threads in parallel on a single multi-core processor instead of processing threads in a linear fashion. Bus Saturation is a condition where attempts to put data/addresses on the bus are denied. The "snoop" to determine if the target processor is available is denied because the target processor is busy. The initiator is told to retry later. By scaling back the number of SMT threads we are reducing the load on the target processors so the bus appears to become "free" but what is actually becoming available is the resource at the end of the bus. The present disclosure presents a method to detect bus saturation using hardware counter statistics and hardware configuration information, and to provide a feedback mechanism to the operating system (AIX, for example). The operating system can then react to help reduce bus traffic, thus improving performance.

With each core per socket that is added to the system, 2 to 4 more threads (as an example) are included in the set of logical threads that are already creating bus traffic. As traffic rises to the point of saturating the bus the system will begin to experience higher "bus retries". This is a hardware counter statistic that is readily available from the system firmware. The performance impact of increasing numbers of bus retries will depend on the workload(s) running on the system, so the system administrator should be given the option of setting an appropriate retry threshold which will trigger the operating system to react. The system firmware will report the retry rate to a kernel service, a daemon, for example. A simple method for reporting a threshold condition could be a firmware-generated interrupt. In a simple example, the kernel service will determine if the threshold has been met based on the feedback from the firmware. If so, it will execute a system call that will moderate traffic with an operating system tunable. Using AIX as an example, the number of SMT threads per core will be reduced from 4 to 2 using a system call. This effectively throttles back the amount of logical threads per core. However, 4 SMT threads per core can provide a sizeable performance gain for workloads that can take advantage of it, so a mechanism must also exist to ramp up from 2 SMT threads to 4 SMT threads (as an example) on a system that has been previously throttled back. For this reason we must have a low-water mark on the retry rate. This again, should be tunable by the system administrator. A low-water mark that is too high (i.e. too close to the trigger that throttles back) will mean the machine is constantly toggling back and forth on the number of SMT threads as bus traffic fluctuates. This will result in poor performance as data structures, memory, and footprint characteristics are established, then destroyed for the threads that are being added then removed. On the other hand, a low-water mark that is too low (requiring that the bus traffic fall to some very low value) may mean that the system will be underutilized for long stretches of time.

FIG. 1 illustrates an exemplary embodiment of a system in which the present invention may be implemented. As shown, cores 101, 103 and 105 are connected to a main bus 107. The system may also include additional cores 109. A bus snoop device 111 keeps track of bus request retries which occur when a bus is busy and a requesting device is denied access to the bus. The requesting device must retry at a later time to gain access to the target device. The number of bus requests that are retried is a measure of the load on the bus, i.e. the number of bus access requests that are being generated by the system. The number of retries is tracked and stored in a counter/register 113 in one example. The retry number may also be determined by the system software and kept in system memory and made available for subsequent access. The current retry count is compared against the low and high water thresholds 115 which have been pre-set into the system. When the bus request retry number is above the high water mark, the system is tending toward saturation and a system call or interrupt is made to all operating systems to moderate traffic in one of many predetermined manners to reduce the bus access requests. Similarly, when the bus request retry number is below a low water mark, the system is being underutilized and a system call or interrupt is made to all operating systems to moderate traffic in any of many predetermined manners by increasing the allowable number of bus requests. The OS or systems thereby rely on the retry count to be warned of a saturation event. It is noted that this methodology is also applicable for a system-wide implementation. Thus, when the OS is notified to take action, it can either be a single OS or a system with multiple OS. All of the OSs have to work together because once allowable bus requests are ramped down, the system can not be ramped-up again unless all OSs ramp down and achieve the low-water mark.

Figure 2:
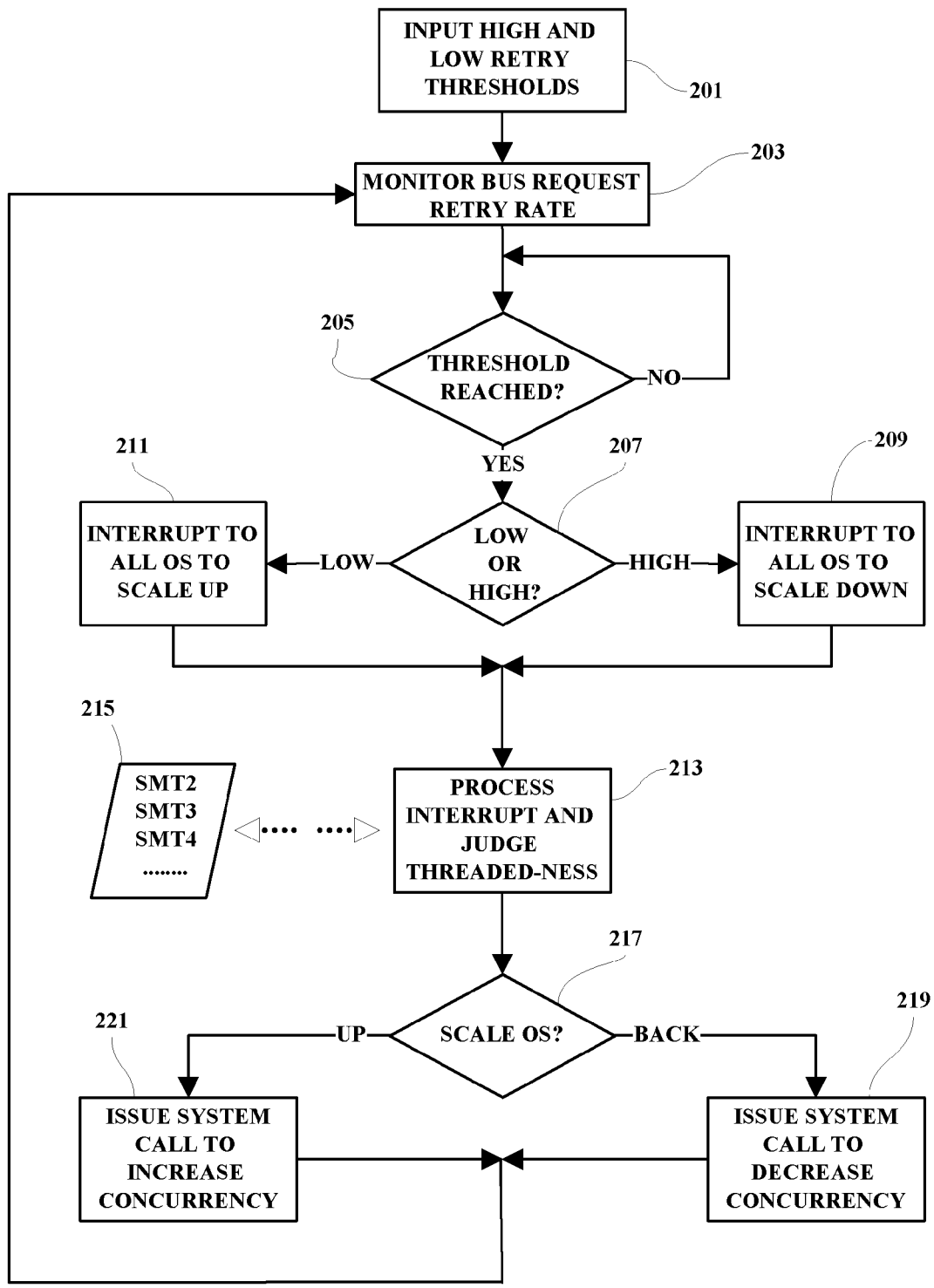
FIG. 2 is a flow chart illustrating an exemplary sequence of operations which may be implemented in accordance with the present invention.

An exemplary sequence of operations is illustrated in the FIG. 2 flow chart. As shown, once high and low retry thresholds are established and input 201 into the system, the bus request retry rate is monitored 203 and when one of the thresholds is reached 205, appropriate traffic moderating action is taken. If the retry rate is too high 207, then an interrupt is generated to all operating systems to scale down 209 and limit, at least temporarily before bus saturation occurs, access request retries to the bus. If, on the other hand, the retry rate is too low 207, then an interrupt is generated to all operating systems to scale up 211 and increase the allowable retry rate to increase system performance. This is accomplished by having the OS receive and process the interrupt 213, for example by passing the interrupt to a daemon for interpretation, and to judge the "threadedness" 215 of the system. If a scale-back is required 217, then a system call 219 is caused to be issued to decrease thread concurrency 221 to avoid bus saturation. If a scale-up is required 217 then a system call 221 is caused to be issued to increase thread concurrency 221 for increased performance. After a predetermined incremental scale-up or scale-back of the thread concurrency has been accomplished, the system continues to monitor the bus request retry rate 203 thereby providing a dynamic, yet passive, moderation of system bus traffic and avoiding bus saturation while optimizing system performance.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory storage media from which it may be loaded and/or transmitted into other media and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing bus access requests in a computer system having a bus and a plurality of bus access requesters, said method comprising:
   continuously determining an actual retry number of bus access request retries made by said bus access requesters;
   using said actual retry number to modify a number of allowable bus access request retries which can be made by said bus access requesters;
   comparing said actual retry number to a predetermined threshold value in order to determine said number of allowable bus access request retries;
   reporting said actual retry number to an operating system (OS) in said computer system, said comparing being accomplished by said OS; and
   executing a system call from OS, said system call being effective to moderate said allowable bus access requests.

2. The method as set forth in claim 1 and further including:
   reducing said number of allowable bus access requests if said actual retry number exceeds a high level threshold value.

3. The method as set for in claim 1 and further including:
   increasing said number of allowable bus access requests if said actual retry number is less than a low level threshold value.

4. The method as set forth in claim 1 wherein said computer system includes a plurality of cores coupled to said bus, said method further including:
   using said system call to reduce a number of simultaneous multithreading (SMT) threads per core when said actual retry number exceeds a high level threshold value.

5. The method as set forth in claim 1 wherein said computer system includes a plurality of cores coupled to said bus, said method further including:
   using said system call to increase a number of simultaneous multithreading (SMT) threads per core when said actual retry number is less than a low level threshold value.

6. A computer program product comprising a computer-readable, tangible storage device(s) and computer-readable program instructions stored on the computer-readable, tangible storage device(s), the computer-readable program instructions, when executed by a processor, being operable for processing bus access requests in a computer system having a bus and a plurality of bus access requesters, said method comprising:
- continuously determining a actual retry number of bus access request retries made by said bus access requesters;
- using said actual retry number to modify a number of allowable bus access request retries which can be made by said bus access requesters;
- comparing said actual retry number to a pry determined threshold value in order to determine said number of allowable bus access request retries;
- reporting said actual retry number to operating system (OS) in said computer system, said comparing being accomplished by said OS; and
- executing a system call from said OS, said system call being effective to moderate said allowable bus access requests.

7. The computer program product as forth in claim 6, said method further including:
- reducing said number of allo cable bus access requests if said actual retry number exceeds a high level threshold value.

8. The computer program product as set for in claim 6, said method further including:
- increasing said number of allowable bus access requests if said actual retry number is less than a low level threshold value.

9. The computer program product as set forth in claim 6 wherein said computer system includes a plurality of cores coupled to said bus, said method further including:
- using said system call to reduce a number of simultaneous multithreading (SMT) threads per core when said actual retry number exceeds a high level threshold value.

10. The computer program product as set forth in claim 6 wherein said computer system includes a plurality of cores coupled to said bus, said method further including:
- using said system call to increase a number of simultaneous multithreading (SMT) threads per core when said actual retry number is less than a low level threshold value.

11. A system for processing bus access requests, said system including a bus and a plurality of bus access requesters, said system comprising:
- determining means for determining a actual retry number of bus access request retries made by said bus access requesters;
- modifying means arranged to receive said actual retry number, said modifying means being operable for using said actual retry number to modify a number of allowable bus access request retries which can be made by said bus access requesters, said modifying means including comparing means arranged to receive said actual retry number, said comparing means being operable for comparing said actual retry number to a predetermined threshold value in order to determine said number of allowable bus access requests, said system further including:
- reporting means for reporting said actual retry number to an operating system (OS), said comparing being accomplished by said OS; and
- system call means for executing a system call from said OS, said system call being effective to moderate said allowable bus access requests.

12. The system as set forth in claim 11 and further including:
- reducing means arranged to receive said actual retry number, said reducing means being arranged for reducing said number of allowable bus access requests if said actual retry number exceeds a high level threshold value.

13. The system as set for in claim 11 and further including increasing means arranged to receive said actual retry number, said increasing means being arranged for increasing said number of allowable bus access requests if said actual retry number is less than a low level threshold value.

14. The system as set forth in claim 11 wherein said system includes a plurality of cores coupled to said bus, said system further including:
- reducing means arranged to receive said actual retry number, said reducing means being arranged for using said system call to reduce a number of simultaneous multithreading (SMT) threads per core when said actual retry number exceeds a high level threshold value.

15. The system as set forth in claim 11 wherein said system includes a plurality of cores coupled to said bus, said system further including:
- means for using said system call to increase a number of simultaneous multithreading (SMT) threads per core when said actual retry number is less than a low level threshold value.

* * * * *